April 8, 1952     C. S. BALLARD     2,592,376
APPARATUS FOR MAKING DENTURES

Filed Feb. 9, 1948     3 Sheets-Sheet 1

INVENTOR.
Charles S. Ballard
BY
ATTORNEYS.

April 8, 1952 C. S. BALLARD 2,592,376
APPARATUS FOR MAKING DENTURES
Filed Feb. 9, 1948 3 Sheets-Sheet 2

INVENTOR.
Charles S. Ballard
BY
ATTORNEYS.

April 8, 1952 C. S. BALLARD 2,592,376
APPARATUS FOR MAKING DENTURES
Filed Feb. 9, 1948 3 Sheets-Sheet 3

INVENTOR.
Charles S. Ballard
BY
ATTORNEYS.

Patented Apr. 8, 1952

2,592,376

UNITED STATES PATENT OFFICE 2,592,376

APPARATUS FOR MAKING DENTURES

Charles S. Ballard, Seattle, Wash.

Application February 9, 1948, Serial No. 7,122

8 Claims. (Cl. 18—5.7)

This invention relates to the production of artificial dentures, and for its general object aims to provide a new apparatus for making dentures, looking primarily to an elimination of the causes responsible for dentures failing to properly fit a patient's mouth even though the dentist or technician concerned has previously taken a perfect impression of the patient's mouth, has properly utilized this impression to make a wax model of the denture to be formed, and has also produced a denture-forming matrix which accurately corresponds to the shape of the model. Otherwise stated, the invention has for its general object the provision of apparatus for producing artificial dentures which overcomes certain weaknesses in previous practices entirely removed from the human factor.

Enlarging somewhat upon the weaknesses in mind, it is generally recognized that the thermoplastic material from which very nearly all artificial dentures are made is inherently subject to a certain amount of shrinkage as curing proceeds. The heat-curing takes place within the matrix, and considering that the flask containing the matrix is necessarily closed during the curing period, the problem is perforce one of finding how the material of the denture can be supplemented with additional thermo-plastic in a quantity sufficient to compensate for the shrinkage. This is, however, a problem considerably more complex than would at first appear, and must take into consideration the fact that the plastic sets coincident with its curing, and that the shrinkage which develops is progressive, wherefore the supplementary material, albeit the quantity needed is small, must therefore be continually supplied throughout the period necessary for curing, and which is to say as long as the curing denture retains sufficient plasticity to shrink. Moreover, it becomes necessary that the curing be so handled as to assure zonal control, and by this I mean to say that, given a centralized point at which supplementing material is introduced to the matrix and appreciating that the same must be free to feed therefrom throughout the entire compass of the matrix, it then becomes essential that the initial setting be made to take place at the outermost fringe of the denture and work progressively therefrom toward the point of supply. The accomplished end is to hold inner reaches of the denture in a relatively fluid state and thus maintain a path along which the denture material may flow in its necessary travel to the outer reaches, and as compared with the damming action which is the natural consequence where proximal areas of the denture are allowed to set while distal areas still remain in a state admitting to further shrinkage.

Having, therefore, as its principal object the provision of a new apparatus for effectively replacing losses from shrinkage, and with said apparatus being characterized by certain other advantages which will appear and be understood in the course of the following description and claims, the invention consists in the novel construction, adaptation, and combination of the parts which comprise the apparatus, and in the advanced technique permitted by the use thereof in practicing the process of producing artificial dentures, all of which will be hereinafter described and claimed.

In the accompanying drawings:

Figure 1 is a transverse vertical sectional view illustrating a press constructed in accordance with the preferred teachings of the present invention and showing therein a flask and a wax model of a denture contained within the flask. The flask which I portray is one suitable for practicing a technique of the nature which I illustrate and describe in my prior United States Patent No. 2,245,849, issued June 17, 1941, and namely a technique in which molten metal is poured into the flask, the press with its contained flask being here shown preparatory to receiving the molten metal.

Fig. 2 is a fragmentary elevational view detailing the venting core shown in Fig. 1.

Fig. 3 is a fragmentary longitudinal vertical sectional view showing the press and associated flask at a later stage of the process, and namely after (1) the molten metal has been poured and set, (2) the wax of the model replaced by thermoplastic denture material, and (3) the core removed and a material charger inserted therefor. At the stage of the process which this view illustrates, the denture material is subjected to curing heat, and the view illustrates the manner in which I apply a coolant to modify the effective transfer of heat and retard curing in the area of the sprue.

5 but reduced from the scale employed in Figs. 1 through 4, inclusive; and

Figure 7:
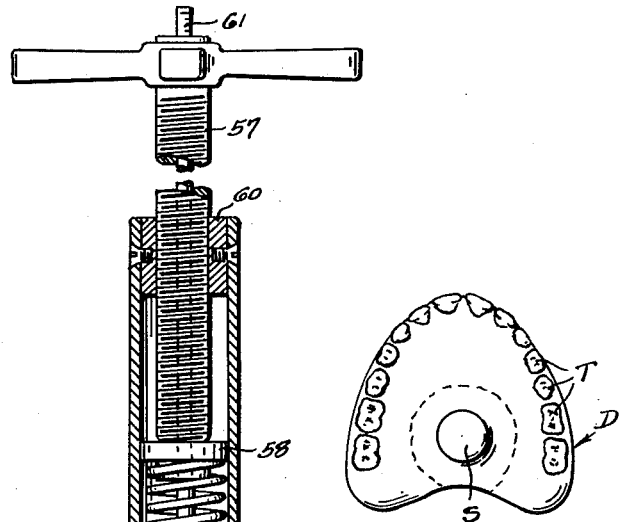

Fig. 7 is a plan view of a cured upper denture as it appears upon removal from the flask.

The press which I desirably employ in practicing the technique of the present invention is of a generally box-shaped configuration when viewed in side elevation, providing separated legs denoted by the numeral 10 formed at the lower ends with bearing feet 11 and connected across the bottom by an integral cross-arm 12 and across the top by an integral yoke 13. The yoke is centrally apertured as at 14. Presented by the cross-arm is an open-bottom facing socket of semi-spherical shape perpendicularly aligned with the axial center of the aperture, and there is stepped in this socket a mating member 15 which is center-bored and threaded. Working in these threads is a jack-screw 16 surmounted by a plate 17, and from the upper face of this plate there projects a centrally placed boss 19, the boss serving as a mounting for a ball-bearing 20. Sustained by said ball-bearing is a carrier 21 presenting laterally extended lugs 22 which bear upon side edges of the legs to restrain the carrier against rotation, and seating upon the carrier is the lower of two complementary flask members denoted 23 and 24. The lower half 23 of the flask fits in a recess 25 of the carrier 21 to hold the same against lateral shifting, and to insure registration of the flask-elements there are provided pins 26 (Fig. 4) extending through aligned pocket-holes formed in the two elements. The flask's upper half 24 provides an upstanding neck 27 adapted by jack action of the screw 16 to be brought firmly to bear against the underside of the yoke, and this neck presents a wide mouth 28 giving access for the pouring of molten metal, hereinafter to be described.

Arranged and adapted to be removably secured in adjusted position upon the floor of the flask is a model base 30 designed to carry a plaster replica, denoted 31, of the ridge or arch for which the denture is being made. Complementary to and arranged to overlie this plaster replica and with the latter being molded upon a wax model of the denture is a second plaster body 32, and serving to house both of these plaster bodies is an incasement which is formed to present a head wall 33 depressed in the center and having a marginal skirt 35. The incasement and the model base are each produced from a metal high in heat conductivity, preferably aluminum, and characterizing the head wall of the incasement is a center aperture serving as a sprue opening. This sprue opening provides a bevelled seat upon its upper side. Above the sprue opening is an upstanding boss 34 presenting a threaded center-bore appreciably larger in diameter than the diameter of the sprue opening, and between these threads and the bevelled seat the body of the boss is desirably cut back to provide an intermediate chamber 39 of expanded compass.

Figures 1, 2:
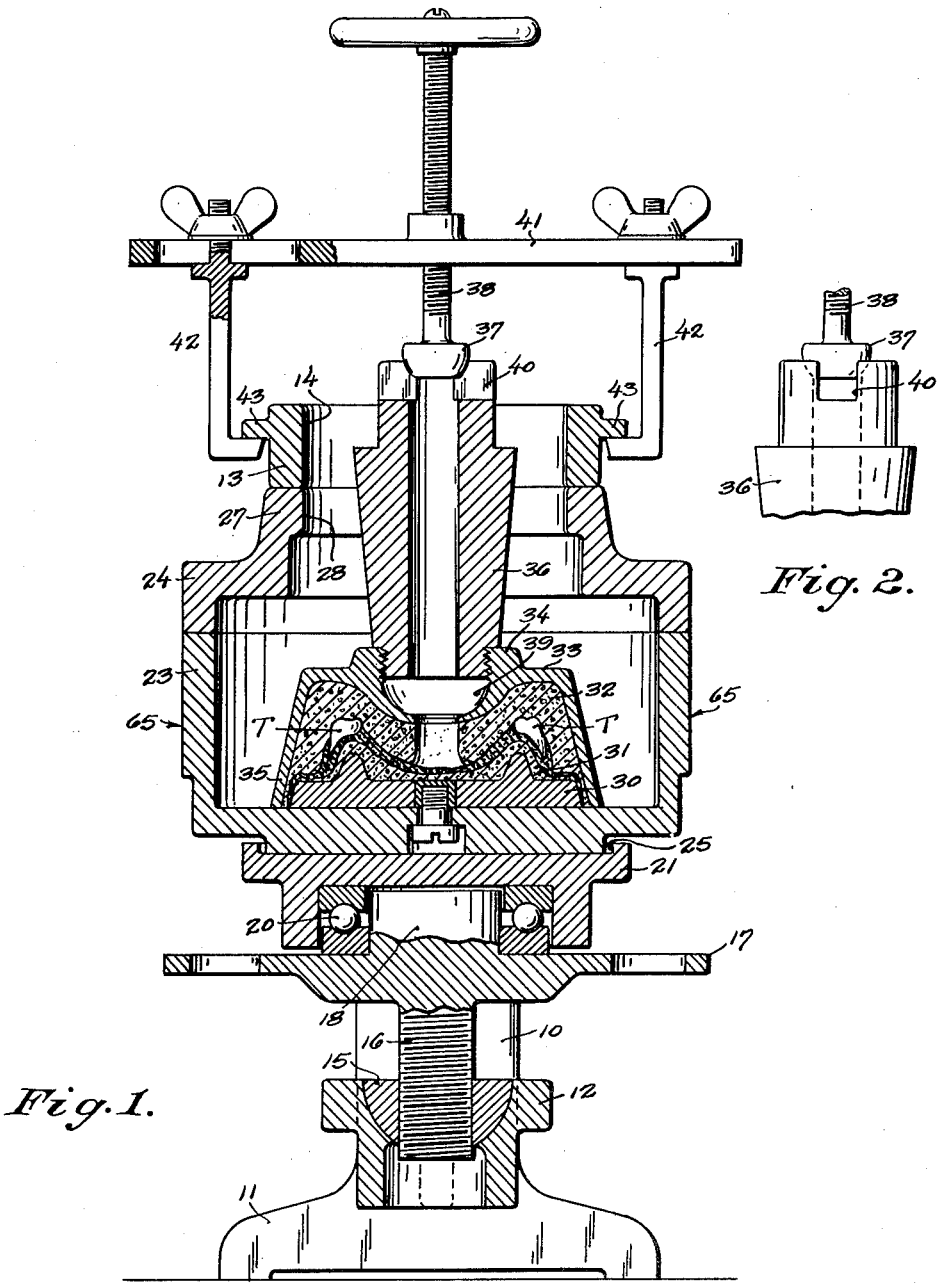

In Fig. 1 there is illustrated a hollow venting core 36 of truncated cone shape having its lower end threaded to engage the threads of the boss 34. The length of this core is sufficient, when the core is applied to the incasement, to have the upper end protrude above the upper limit of the flask, and this upper end is diametrically slotted and presents a socket placed co-axial to the bore and serving as a seat for the reception of a foot-piece 37 carried by a pressure screw 38. The office of the slot, denoted 40, is to permit uninterrupted venting of steam from the head end of the core.

The pressure screw is threadably associated with a removable yoke 41 carrying upon each of its ends a depending strut 42 presenting inturned toes which are arranged to hook under ears 43 which project laterally from diametrically opposite sides of the permanent yoke 13 of the press.

Figure 3:
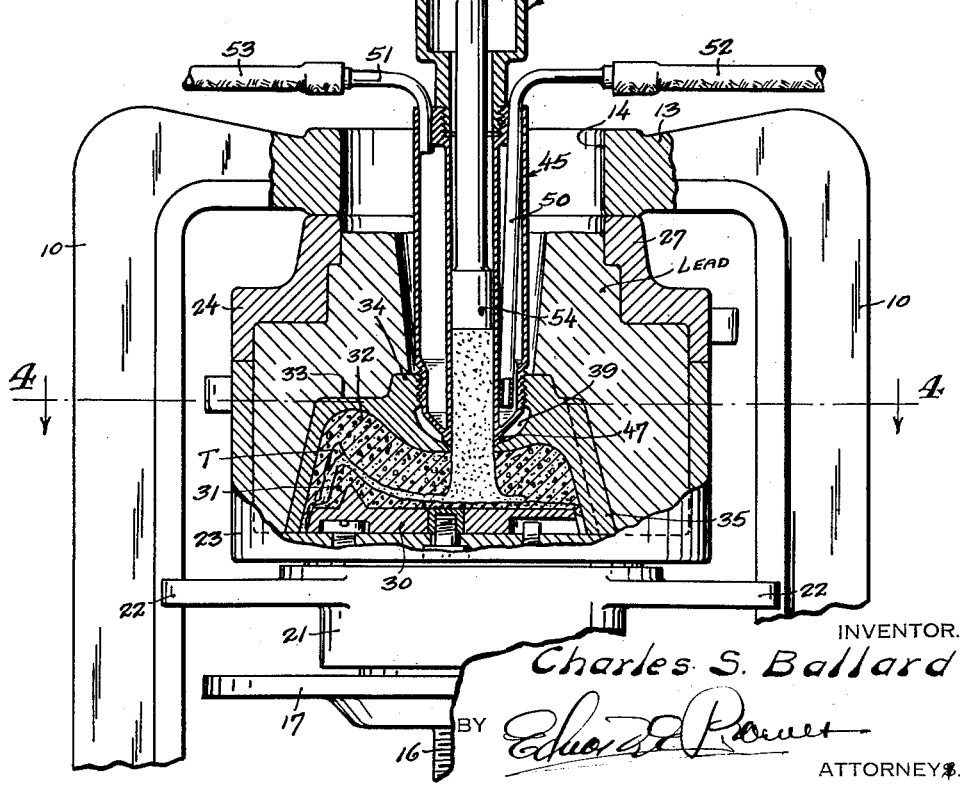
Figures 5, 6:
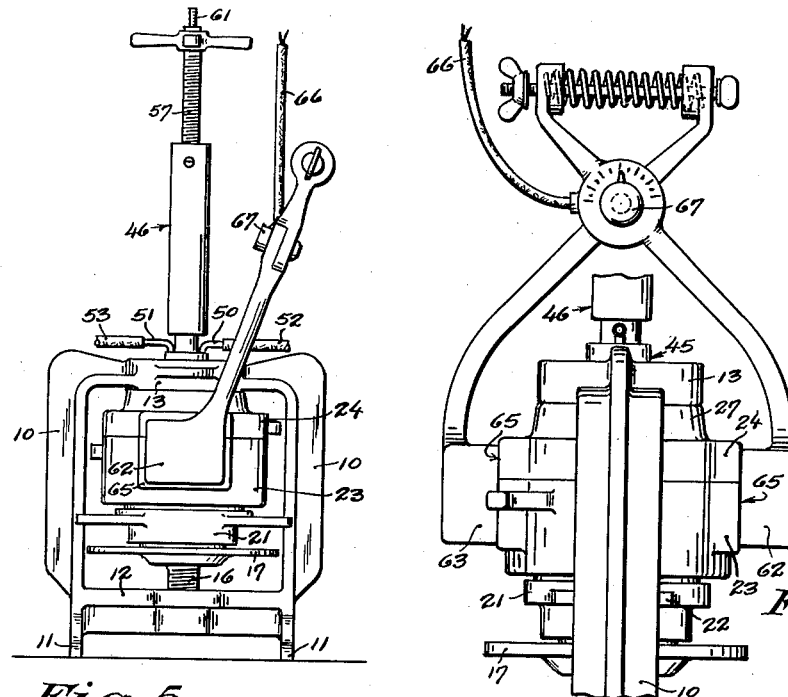
Fig. 5 is a reduced-scale side elevational view showing the press as it appears when curing of the denture material is taking place, the cord for carrying electricity to the heating elements and the hoses for circulation of coolant being shown fragmentarily.
Fig. 6 is a front elevational view of said press with the scale somewhat larger than that of Fig.
Figure 4:
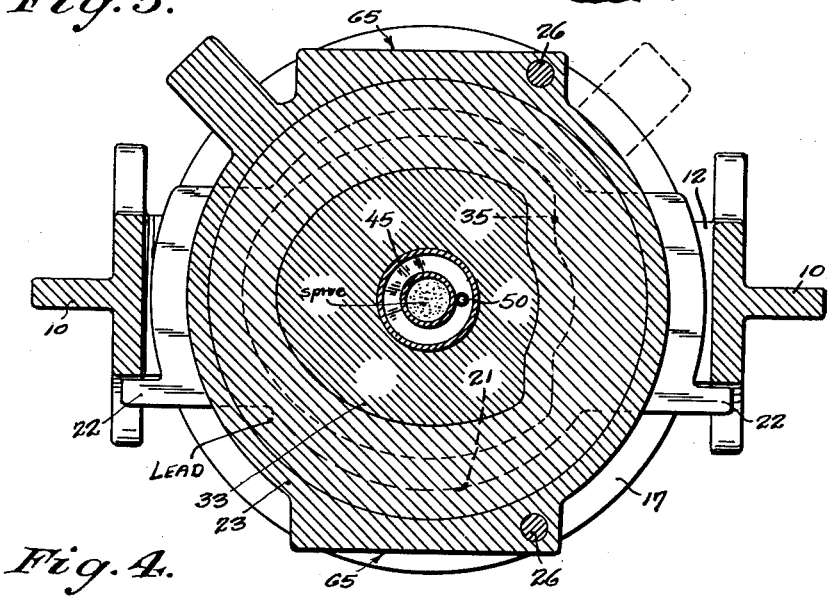
Fig. 4 is a horizontal sectional view on line 4—4 of Fig. 3.

Before proceeding with a description of the material-charger illustrated in Fig. 3, clarity will perhaps be advanced by first tracing the procedural steps performed with the apparatus as it is portrayed in Fig. 1. Let it be assumed that the wax model has been made and that this model is confined between the two bodies of plaster 31 and 32 and which have been pressed over the model while the plaster is in a plastic state, these two plastic bodies of plaster having been first applied, the one as a coating upon the model base 30 and the other as a liner within the metal incasement. The plaster-filled incasement with its subjacent model base and contained model are inserted in the flask with the model base being secured centrally upon the floor of the latter, and the flask is thereupon applied to the press with the jack-screw being taken up to bring the neck 27 firmly against the permanent yoke 13. The operator then threads the hollow venting core 36 into the incasement and applies the removable yoke 41, turning the screw 38 to subject the incasement to such head pressure as will firmly stabilize the incasement against possibility of movement. The next step in the process is to pour into the flask a molten metal having a melting point appreciably lower than the metal of the incasement but sufficiently high to prevent deformation under later application of a heat sufficiently high to accomplish curing of denture material. An alloy of lead, antimony, and tin is satisfactory for the purpose. This molten metal is supplied in a quantity sufficient to bring the upper level well above the incasement, and as the heat of the metal is passed by conduction through the incasement and therefrom through the thin coat of plaster to the wax of the model, the said model melts. Following setting of the poured lead, the pressure screw 38 is backed off and the core 36 unscrewed from the incasement, the diametrical slot which served to vent steam from the matrix of the incasement also giving a purchase for backing off the core although, if desired, the head end of the core can be made hexagonal for application of a wrench. The conical shape of the core perforce causes the core to free itself from the surrounding lead by only a fractional part of a turn and continued backing off is then easily performed with finger-action alone. The jack-screw is now turned to lower the flask and the latter is withdrawn from the press, up-ended to allow the melted wax to pour out the sprue opening, and the flask parts are disassembled.

As the said parts of the flask are separated the poured block of lead and its contained incasement are withdrawn as a unit together with the upper half 24 of the flask, and the two facing surfaces of the open matrix are thoroughly wiped to remove any adherent skin of wax. The operator then applies the particular thermo-plastic which he may prefer, either in jell, powder, or blank form, there being a wide choice of suitable plastics which cure under heat and such, for example, as methyl-methacrylate, which, supplied in powder form, is made into a jell by polymerization with liquid. The flask is reassembled and again introduced to and secured within the press, and the operator now applies the material-charger detailed in Fig. 3. This charger is comprised of a hollow-walled tubular bottom member 45 and an upper pressure gun 46 removably threaded into the head end thereof, the bottom member, which is arranged to register with the sprue opening, being threaded at its lower end to engage the threads of the incasement's boss 34 and having a tapering nose 47 prolonged below the threads and arranged to bottom against the bevelled seat of the sprue opening. Means are provided for circulating cold water or other suitable coolerant through the hollow wall of said member 45, and which I indicate as comprised of inlet and outlet tubes 50 and 51 each connecting with a flexible hose, as 52 and 53, and having the inlet tube projecting downwardly through the hollow wall to obtain a concentrated delivery of the entering coolant directly upon the inside face of the tapering nose 47. The center-bore of said hollow-walled bottom member receives a suitable charge of supplementing thermo-plastic, and applied thereto is a ramming piston 54 the stem of which extends upwardly into the communicating cylinder of the associated gun 46 and is engaged therein by a plunger-head 55 subjected to the thrust force of a spring 56 loaded by the action of a hollow screw 57 bearing upon a spring follower 58, the screw working through a nut 60 removably anchored in the head end of the gun. Made rigid with the plunger-head is a rod 61 extending axially through the screw and having the upper end exposed, graduated markings being provided upon this rod to indicate the effective thrust of the spring.

After applying the material-charger and subjecting the ramming piston to the desired spring pressure, the flask is heated and as a preferred instrumentality for this purpose I employ a detachable accessory formed much in the nature of tongs with the jaws 62—63 each housing an electric heating element and being yieldingly urged one toward the other by a compression spring 64, the jaws seating against flattened cheek-faces 65 provided upon diametrically opposite sides of the flask. The electric heating elements are each wired in an electric circuit fed by a supply cord 66 and including a temperature control regulated by a suitable knob 67. The operator, upon application of heat, also causes cold water to circulate quite rapidly into and from the hollow wall of the material-charger's bottom member 45, and the electric elements are controlled such that the heat carried through the lead block to the incasement transmits to the outer fringes of the matrix a temperature of, say, between 160° F. and 170° F., the temperature being progressively lower as it approaches the water-cooled sprue opening. This temperature condition is maintained for a period of between 45 and 60 minutes, whereupon the volumetric flow of the cooling water is cut down or discontinued entirely and the temperature thereupon responsively builds up. When such rising temperature reaches 200° F. or thereabouts, and which will occur in approximately 15 to 20 minutes, the electric elements are de-energized and the latent heat then completes the curing in a period of approximately 45 minutes. The temperatures and time intervals herein mentioned apply to methyl-methacrylate, other materials requiring different temperatures and times to consummate curing. It will be apparent that the setting of the thermo-plastic will have progressed more rapidly at the fringe than at the center of the matrix, the retardation of such curing around the sprue opening assuring a continued fluid condition as long as there remains any call for supplementing material. Although the curing is most retarded in the immediate locality of the sprue opening, the surrounding body of plastic which intervenes between the sprue and the perimeter of the matrix will retain a fluid condition until the fringe areas have completely set and there is thus assured a free movement of supplementary material wherever needed.

When curing is completed, the flask is removed from the press, the two halves separated to expose the mold, and the incasement is then removed from the upper half of the flask and the plaster 32 cut away from the teeth T to free the denture D (Fig. 7). There remains upon the denture a sprue tag S, and this tag, as well as a skin-thickness of material which fringes the perimeter in consequence of the penetration of the plastic into the crack which occurs between the two bodies of plaster, is then trimmed off, followed by the usual finish work of buffing the denture.

In respect of my usage of the term "thermoplastic," it is pointed out that both this term and the expression "thermo-set plastic" are, whether properly or not, used more or less interchangeably to mean a plastic which is caused to set under application of heat. This is, perforce, the meaning which is to be given to the term in those instances of its occurrence in which such interpretation is inherent to the context. It is, however, to be noted that the machine which I employ to carry into effect the described molding of dentures from heat-setting plastics is also applicable to the molding of dentures from cold-setting plastics, and namely those plastics which are made fluid by subjection to heat and thereafter become set to the form of the mold cavity as cooling progresses. In processing said cold-setting plastics, substantially the reverse of the described procedure would be followed insofar as the heat and cold treatments are concerned, and this is to say that the plastic charged into the mold cavity through the sprue opening would be heated rather than cooled, wherefor in lieu of cooling the nose of the charger member 45 by a circulating stream of cold water said nose would be heated and this could be accomplished either by circulating hot water through the bottom member of the charger or by providing an electrically energized heating coil in surrounding relation to the discharge nose. Also, in lieu of heating the flask, the latter would be cooled either by placing the flask in a refrigerating atmosphere or by circulating cold water through a counterpart of the jaws 62—63. The result of subjecting the injected plastic to these conditions of heat and cold and which, to reiterate, are the reverse of those which are made to prevail when handling heat-setting plastics, would quite obviously be the same as I accomplish when following my preferred first-described technique, and this is to say that the cold-setting plastic would set progressively from the outer fringe toward the centrally placed sprue opening in that the highest temperature would be concentrated at the center while the lowest temperature would occur at the fringe.

While the apparatus as I have elected to illustrate the same is thought to best exemplify my teachings, it is apparent that numerous changes in structural details may be resorted to without departing from the spirit of the invention. I intend that no limitations be implied and that the hereto annexed claims be given the broadest interpretation which the employed language fairly admits.

What I claim is:

1. In the molding of dentures from thermoplastic material, and in combination with a mold incasement providing a sprue opening and having an upstanding boss presenting a threaded center-bore placed co-axial to the sprue opening and giving access to the latter, the sprue opening having a diameter smaller than that of the center-bore and being faced with a bevelled seat, a jacketed cylinder threaded to engage the threads of the boss and providing a tapered nose prolonged below the threads and arranged to bottom upon the seat, the bore of said cylinder being adapted to carry a charge of denture material, a spring-loaded ramming piston working in the cylinder, and means for circulating cooling water under pressure into and from the jacket of the cylinder.

2. The structure of claim 1 in which the water fed to the jacket of the cylinder issues therein directly upon the interior wall of the tapered nose.

3. A flask-press comprising, in combination, a frame providing transversely spaced upright legs connected across the bottom by a horizontal cross-arm and across the top by a horizontal yoke, said cross-arm presenting an open-bottom facing socket of semi-spherical shape, a nut formed in mating correspondence with the socket and stepped in the latter, a jack-screw working in the threads of the nut, a carrier for the flask journaled for relative rotary movement upon the head end of the screw and itself held against rotation relative to the frame, and means for turning the jack-screw whereby, upon rising movement, to elevate the carrier and bring the top of the flask firmly to bear against the underside of the yoke.

4. In the denture-making art, in combination with a flask, and with a mold incasement formed to provide a threaded bore leading to a sprue opening which is co-axial therewith, said incasement being arranged in use to occupy a position within the flask, a hollow core-piece arranged to communicate by its hollow center with the sprue opening of the incasement and threaded upon its inner end to engage the internal threads of the bore, the core-piece providing a waist portion which tapers inwardly toward said threads and is produced to a length such that, upon threading the core-piece into the incasement and then pouring incasement-investing metal in a molten state into the flask, the outer limit of said tapered waist protrudes above the level of poured metal, the tapering form of said waist and the fact of its inner end being threaded into the incasement permitting the core-piece, after the poured metal has set, to be instantly drawn away and freed from the investing metal by the act of backing off the threads through only a fractional part of a turn.

5. In the molding of dentures from thermoplastic material, and in combination with a mold incasement presenting an exposed threaded socket bottomed by a floor in which there is provided a centrally placed sprue opening, a jacketed cylinder threaded to engage the threads of the socket and arranged to bear by its inner end upon the floor of the socket with the interior of the cylinder in communication with the sprue opening, the bore of said cylinder being adapted to contain denture material, a ram working in the cylinder for charging the contained denture material through the sprue opening into the incasement, and means for circulating water through the jacket of the cylinder.

6. A flask-press comprising, in combination: a frame providing transversely spaced upright legs connected across the bottom by a horizontal cross-arm and across the top by a horizontal yoke, said cross-arm presenting an open-bottom facing socket of a semi-spherical shape, a nut formed in mating correspondence with the socket and stepped in the latter, a jack-screw working in the threads of the nut, a carrier for the flask sustained upon the head end of the screw, and means for establishing relative turning motion as between the jack-screw and the nut to raise or lower the sustained flask according to the direction of said relative movement, the act of raising the flask causing the top thereof to be brought firmly to bear against the underside of the yoke.

7. The structure of claim 6, and adjuncts thereof for use in practicing the described denture-making process, said adjuncts comprising a mold incasement seating upon the floor of the flask and presenting a sprue opening in its upper wall, an upstanding hollow core-piece detachably associated with and footing upon the incasement with its hollow center in communication with the sprue opening of the incasement, and clamping means taking a purchase from the yoke and exerting downward force upon the head end of the core-piece to hold the incasement firmly pressed against the floor of the flask while metal in a molten state is poured into the flask to invest said incasement.

8. In the denture-making art, a flask, a frame, means for securely clamping said flask to the frame, a mold incasement seating upon the floor of said flask and presenting a sprue opening in its upper wall, an upstanding hollow core-piece detachably associated with and footing upon the incasement, said core-piece presenting a socket in the head end placed co-axial to the bore and having a vent below said socket communicating with the bore, a thrust member seating in said socket, and clamping means taking a purchase from the yoke and exerting pressure through the thrust member upon the core-piece for holding the incasement firmly seated upon the floor of the flask while metal in a molten state is poured into the flask to invest said incasement.

CHARLES S. BALLARD.

REFERENCES CITED

The following references are of record in the file of this patent:

UNITED STATES PATENTS

| Number | Name | Date |
|---|---|---|
| 1,941,780 | Angell | Jan. 2, 1934 |
| 1,974,663 | May | Sept. 25, 1934 |
| 2,049,011 | Joannides | July 28, 1936 |
| 2,279,952 | Pryor | Apr. 14, 1942 |
| 2,359,152 | Pryor et al. | Sept. 26, 1944 |
| 2,442,847 | Galley | June 8, 1948 |
| 2,460,831 | Kovacs | Feb. 8, 1949 |